United States Patent
Hwang et al.

(10) Patent No.: US 7,113,808 B2
(45) Date of Patent: Sep. 26, 2006

(54) APPARATUS AND METHOD FOR TRANSMITTING AND RECEIVING SIGNALS USING MULTI-ANTENNAS

(75) Inventors: Chan-Soo Hwang, Yongin (KR); Jae-Hak Chung, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 572 days.

(21) Appl. No.: 10/650,857

(22) Filed: Aug. 29, 2003

(65) Prior Publication Data

US 2004/0042558 A1  Mar. 4, 2004

(30) Foreign Application Priority Data

Aug. 30, 2002 (KR) ............... 10-2002-0051881

(51) Int. Cl.
  *H04M 1/00* (2006.01)
(52) U.S. Cl. .............. 455/562.1; 455/69; 370/334; 375/267
(58) Field of Classification Search .......... 455/562.1, 455/69, 101, 272, 277.1; 370/334; 375/220, 375/221, 267, 299
See application file for complete search history.

(56) References Cited

U.S. PATENT DOCUMENTS

2005/0094598 A1* 5/2005 Medvedev et al. ......... 370/329

OTHER PUBLICATIONS

Barroso et al.—Blind Identification of MIMO Channels, etc . . . , 1999, pp. 70-74.

Khalighi, et al., "Water Filling Capacity of Rayleigh MIMO Channels", 12th IEEE Intnl. Symposium on Personal, Indoor and Mobile Radio Communications, PIMRC 2001, Proceedings, vol. 1, pp. A155-A158 (Sep. 30, 2001).

Sampath, et al., "Joint Transmit and Receive Optimization for High Data Rate Wireless Communication Using Multiple Antennas", Signals, and Computers, 1999, Conference Record of the 33rd Asilomar Conference, IEEE, Piscataway, NJ, USA, IEEE, vol. 1, pp. 215-219, (Oct. 24, 1999).

Zhou, Shengli, et al., "Optical Transmitter Eigen-Beamforming and Space Time Block Coding Based on Channel Mean", IEEE Intnl. Conference on Acoustics, Speech, & Signal Processing (ICASSP), Orlando, FL, USA, IEEE, vol. 4, pp. III.2852-III.2856 (May 13, 2002).

* cited by examiner

*Primary Examiner*—Lee Nguyen
(74) *Attorney, Agent, or Firm*—Lee & Morse, P.C.

(57) ABSTRACT

An apparatus and method for transmitting and receiving signals using multi-antennas are disclosed. The signal transmitting apparatus for transmitting signals to a plurality of receiving apparatuses, using multi-antennas, includes: a V generator which generates a beamforming matrix V for a predetermined channel; a water filling unit which does not perform water filling for a training signal that is pre-known by the receiving apparatuses, and performs water filling for a user signal to be transmitted by using the V matrix and predetermined control values; a V operation unit, which multiplies a signal output from the water filling unit by the V matrix and transmits the multiplied result through the multi-antennas; and a control value detector, which extracts the control values from signals received from the receiving apparatuses through the multi-antennas, and outputs a maximum value among the extracted values to the water filling unit.

16 Claims, 3 Drawing Sheets

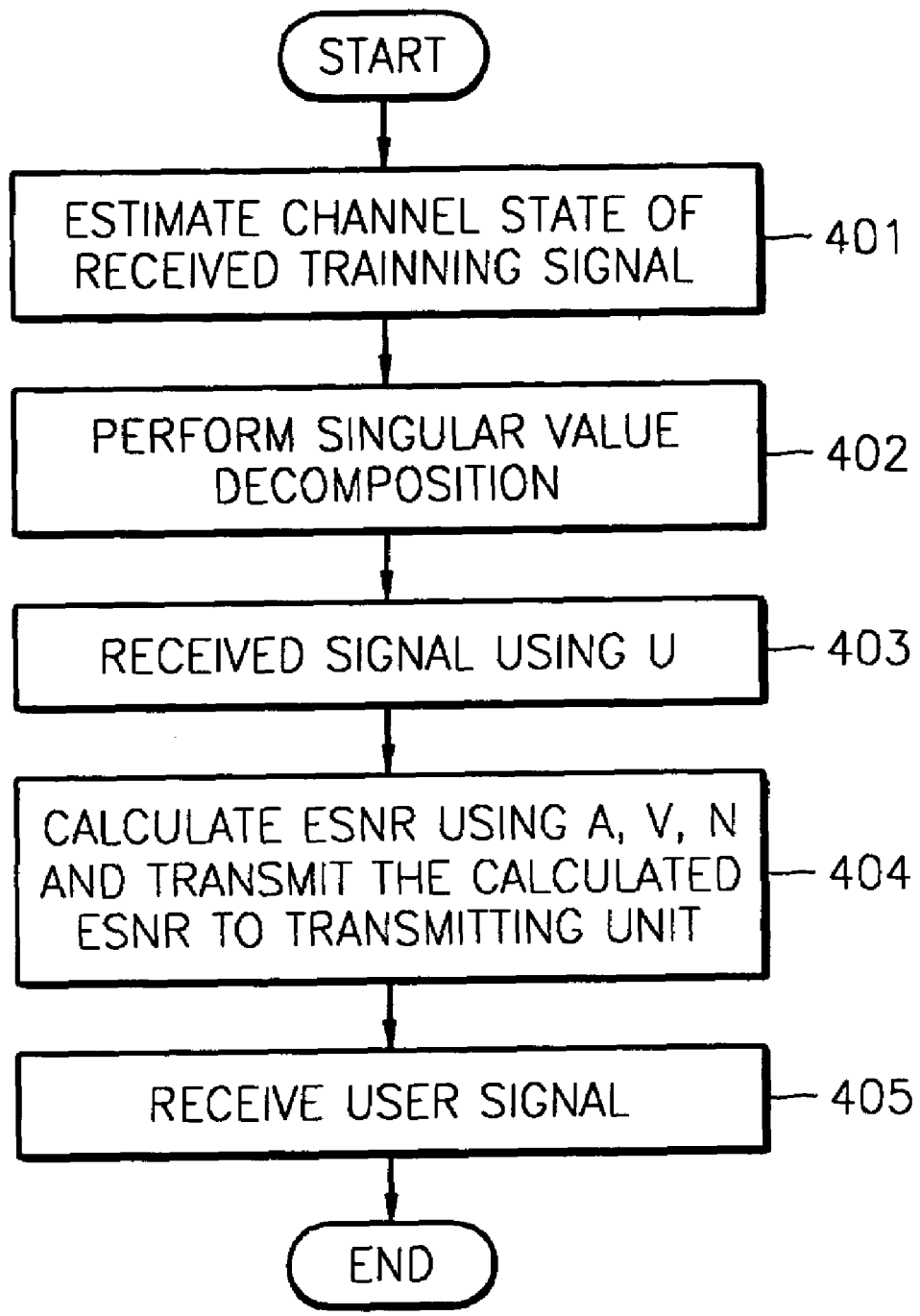

APPARATUS AND METHOD FOR TRANSMITTING AND RECEIVING SIGNALS USING MULTI-ANTENNAS

BACKGROUND OF THE INVENTION

1. Field of the Invention

The present invention relates to an apparatus and method for transmitting and receiving signals using multi-antennas.

2. Description of the Related Art

Methods for transmitting and receiving signals using multi-antennas have a higher channel-use efficiency than conventional methods using a single antenna. Such methods using multi-antennas include a method that obtains transmission diversity by using multi-antennas on a transmitting side, and a method that obtains receipt diversity by using multi-antennas on a receiving side. In addition, there have been provided a method that obtains transmission and receipt diversities by using multi-antennas on both a transmitting side and a receiving side, and a method that forms parallel channels to transmit and receive signals after optimizing a transmitting side through beamforming.

The method that uses multi-antennas on both the transmitting side and receiving side performs beamforming using these multi-antennas, and then performs water filling, and optimization of the transmitting side provides a higher transmission speed or a higher capacity under the same channel environments. In a system using frequency division duplex FDD, however, in which separate channels (bandwidths) are used for transmitting and receiving, the receiving channel information differs from the transmitting channel information. Therefore, the receiving side should estimate channel information and send the estimated information to the transmitting side, so that the transmitting side can "learn" the transmitting channel information. Consequently, the number of antennas increases, and twice as much channel information as the number of antennas is required. If the channel environment changes continuously, the transmission period of channel information to the transmitting side becomes faster, resulting in deterioration of channel-use-efficiency.

To solve these problems, in a general cellular communication system including one base station and a plurality of user communication terminals within one cell, the base station presumes a certain transmitting channel. The base station then performs beamforming to optimize itself to the presumed transmitting channel. Each communication terminal measures the effective signal-to-noise-ratio (ESNR) of a received signal, and sends the measured ESNR to the base station. Then, the base station compares the ESNR values received from the respective communication terminals, and transmits signals to a communication terminal having the best channel state, during a predetermined time period. Then, during a next predetermined time period, the base station again searches for a communication terminal having the best channel state, and transmits signals to the communication terminal having the best state. This is called a multi-user transmission method. However, it is difficult to optimize the base station in a multi-user transmission method because the base station performs beamforming and transmits the beams.

SUMMARY OF THE INVENTION

The present invention provides an apparatus and method for transmitting and receiving signals using multi-antennas, which allow a base station having multi-transmitting antennas to select a communication terminal having an optimal channel state using predetermined feed-back values received from communication terminals having multi-receiving antennas and transmit the signals to the selected communication terminal.

According to a feature of an embodiment of the present invention, there is provided a signal transmitting apparatus, which transmits signals to a plurality of receiving apparatuses using multi-antennas, the transmitting apparatus including: a V generator, which generates a beamforming matrix V for a predetermined channel; a water filling unit, which does not perform water filling for a training signal that is pre-known by the receiving apparatuses, and performs water filling for a user signal to be transmitted, the water filling being performed using the V matrix and predetermined control values; a V operation unit, which multiplies a signal output from the water filling unit by the V matrix, and transmits the multiplied result through the multi-antennas; and a control value detector, which extracts the control values from signals received from the receiving apparatuses through the multi-antennas, and outputs a maximum value among the extracted values to the water filling unit. The control values may be effective signal-to-noise-ratios (ESNRs).

According to another feature of an embodiment of the present invention, there is provided a plurality of signal receiving apparatuses that receive, through multi-antennas, signals that are transmitted by a transmitting apparatus through a plurality of channels, each signal receiving apparatus including: a channel estimation and UH generator, which estimates a state of a channel through which a training signal has been passed, and processes the estimated channel state information to generate matrices including a receiving side unitary matrix UH for the channel if the training signal that is pre-known by the transmitting apparatus is received, an UH operation unit, which decodes by multiplying a signal received through the multi-antennas by UH; and an effective-signal-to-noise-ratio (ESNR) calculator, which calculates an ESNR from noise detected during the decoding and the matrices, except the UH, and outputs the ESNR to the transmitting apparatus through the multi-antennas if the signal received through the multi-antennas is the training signal that is pre-known by the transmitting apparatus. The estimated channel state information may be processed by singular value decomposition. The ESNR may be calculated using the following equation:

$$ESNR = \frac{A_1 V_{ii}}{A_1 \sum V_{ij(i \neq j)} + N^2},$$

wherein the matrices, except $U^H$, are a channel gain matrix $A_1$ and a beamforming matrix $V_{ij}$ respectively, and N denotes the noise.

According to another feature of an embodiment of the present invention, there is provided a signal transmitting and receiving system in which signals are transmitted and received between a transmitting apparatus and a plurality of receiving apparatuses, the transmitting apparatus and receiving apparatuses each including multi-antennas, the signal transmitting apparatus including: a V generator, which generates a beamforming matrix V for a predetermined channel; a water filling unit, which does not perform water filling for a training signal that is pre-known by the receiving apparatuses, and performs water filling for a user signal to be transmitted, the water filling being performed using the V matrix and predetermined control values; a V operation unit, which multiplies an output signal of the water filling unit by the V matrix, and transmits the multiplied result through the multi-antennas; and a control value detector, which extracts the control values from a signal received from the receiving apparatuses through the multi-antennas, and outputs a maximum value among the extracted values to the water filling unit, and each of the signal receiving apparatuses including: a channel estimation and $U^H$ generator, which estimates a state of a channel through which the training signal has been passed, and processes the estimated channel state information to generate matrices including a receiving side unitary matrix $U^H$ for the channel if the training signal is received; an $U^H$ operation unit, which decodes by multiplying a signal received through the multi-antennas by the $U^H$; and a control value calculator, which calculates a predetermined control value from noise detected during the decoding and the matrices, except the $U^H$, and outputs the calculated result to the transmitting apparatus through the multi-antennas if the signal received through the multi-antennas is the training signal.

According to another feature of an embodiment of the present invention, there is provided a signal transmitting method by which signals are transmitted to a plurality of signal receiving apparatuses using multi-antennas, the method including: (a) setting a beamforming matrix V for a predetermined channel; (b) operating the V matrix with a training signal that is pre-known by the signal receiving apparatuses and transmitting the operated result through the multi-antennas; (c) receiving signals from the respective receiving apparatuses, extracting predetermined control values included in the received signals, and selecting a receiving apparatus having an optimal state for the channel by comparing the extracted control values; and (d) transmitting a user signal to the selected receiving apparatus through the multi-antennas. The control values may be ESNRs, and (d) may further include: (d1) applying water-filling to the user signal using the maximum control value among the control values; and (d2) multiplying the water-filling applied user signal by the V matrix and transmitting the multiplied result through the multi-antennas.

According to another feature of an embodiment of the present invention, there is provided a signal receiving method in which signals transmitted from a transmitting apparatus through a plurality of channels are received using multi-antennas, the method including: (a) a receiving apparatus receiving a training signal that is pre-known by the transmitting apparatus and estimating a state of a channel through which the training signal has been passed; (b) processing the estimated channel state information to generate a plurality of matrices including a receiving side unitary matrix; (c) decoding by multiplying the receiving side unitary matrix by the training signal; and (d) calculating an effective-signal-to-noise-ratio (ESNR) using noise detected during the decoding and the matrices generated at (b), except the receiving side unitary matrix, and transmitting the calculated ESNR to the transmitting apparatus.

The signal receiving method above may further include (e) the transmitting apparatus receiving a user signal transmitted by the receiving apparatus; and (f) decoding by multiplying the received user signal by the receiving side unitary matrix. Also, the ESNR may be calculated by the following equation:

$$ESNR = \frac{A_1 V_{ii}}{A_1 \sum V_{ij(i \neq j)} + N^2},$$

wherein the matrices generated at (b), except the receiving side unitary matrix, are a channel gain matrix $A_1$, a beamforming matrix $V_{ij}$, respectively, and N denotes the noise.

According to another feature of an embodiment of the present invention, there is provided a signal transmitting and receiving method by which signals are transmitted and received between a transmitting apparatus and a plurality of receiving apparatuses, the transmitting apparatus and receiving apparatuses each including multi-antennas, the method including: (a) setting a beamforming matrix V for a predetermined channel in the transmitting apparatus; (b) operating the V matrix with a training signal that is pre-known by the receiving apparatuses and transmitting the operated result through the multi-antennas; (c) receiving the training signal and estimating a state of a channel through which the training signal has been passed, in the receiving apparatuses; (d) processing the estimated channel state information to generate a plurality of matrices including a receiving side unitary matrix; (e) decoding by multiplying the receiving side unitary matrix for the channel by the training signal; (f) calculating an effective-signal-to-noise-ratio (ESNR) using noise detected during the decoding and the matrices generated at (d), except the receiving side unitary matrix, and transmitting the calculated ESNR to the transmitting apparatus; and (g) the transmitting apparatus extracting the ESNRs from signals received from the receiving apparatus, selecting a receiving apparatus having an optimal state for the channel by using the extracted ESNR values, and transmitting a user signal to the selected receiving apparatus through the multi-antennas.

The signal transmitting and receiving method may further include (h) the selected receiving apparatus decoding by multiplying the received user signal by the receiving side unitary matrix. Also, in (f), the ESNR may be calculated by the following equation:

$$ESNR = \frac{A_1 V_{ii}}{A_1 \sum V_{ij(i \neq j)} + N^2},$$

wherein the matrices generated at (d), except the receiving side unitary matrix, are a channel gain matrix A1 and a beamforming matrix Vij, respectively, and N denotes the noise. Furthermore, (g) may further include (g1) extracting the ESNRs from the signals received from the receiving apparatuses; (g2) comparing the extracted ESNRs with each other to select a maximum ESNR; (g3) applying water filling to the user signal using the maximum ESNR; and (g4) multiplying the water-filling applied user signal by the V matrix, and transmitting the multiplied result through the multi-antennas.

BRIEF DESCRIPTION OF THE DRAWINGS

The above and other features and advantages of the present invention will become more apparent by describing in detail exemplary embodiments thereof with reference to the attached drawings in which:

FIG. 4 is a flow chart illustrating a method for receiving signals using multi-antennas according to an embodiment of the present invention.

DETAILED DESCRIPTION OF THE INVENTION

Korean Patent Application No. 2002-51881, filed on Aug. 30, 2002, and entitled: "Apparatus And Method For Transmitting And Receiving Signals Using Multi-Antennas," is incorporated by reference herein in its entirety.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
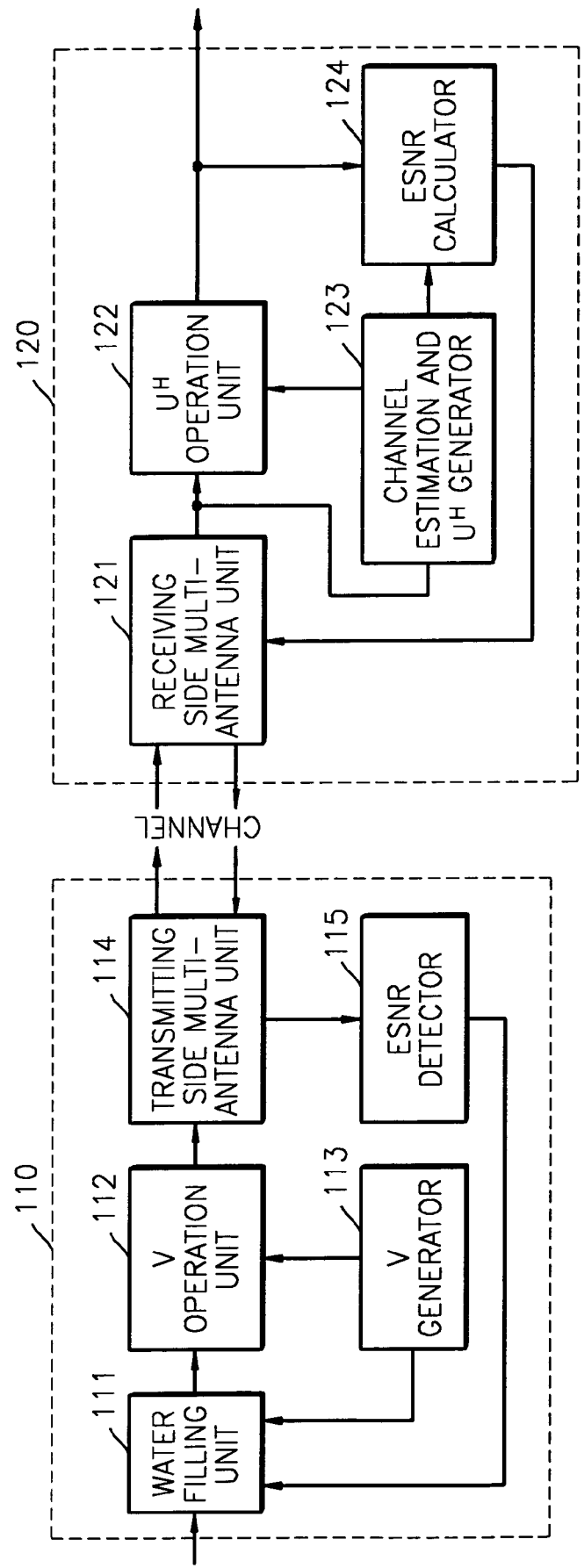
FIG. 1 is a block diagram of a system for transmitting and receiving signals using multi-antennas according to an embodiment of the present invention.

FIG. 1 is a block diagram of a system for transmitting and receiving signals using multi-antennas according to an embodiment of the present invention. Referring to FIG. 1, the signal transmitting and receiving system includes a transmitting apparatus 110 and a receiving apparatus 120. The transmitting apparatus 110 includes a water filling unit 111, a V operation unit 112, a V generator 113, a transmitting side multi-antenna unit 114, and an effective-signal-to-noise-ratio (ESNR) detector 115. The receiving apparatus 120 includes a receiving side multi-antenna unit 121, an $U^H$ operation unit 122, a channel estimation and $U^H$ generator 123, and an ESNR calculator 124. The transmitting apparatus 110 may be a base station in a mobile communication network, and the receiving apparatus 120 may be a user communication terminal communicating with the base station. Also, for convenience' sake, FIG. 1 shows one receiving apparatus 120, but a plurality of receiving apparatuses are provided.

The V generator 113 selects a channel (hereinafter denoted by H) to generate a beamforming matrix V. The selected channel H is represented using singular value decomposition (SVD) as shown in Equation 1 below.

$$H=UAV^H \quad (1)$$

In Equation 1, U denotes a receiving side unitary matrix for the channel obtained using the SVD, A denotes a diagonal matrix, consisting of singular values obtained after the SVD, wherein the singular values represent independently generated gains for various channels, and $V^H$ denotes a Hermitian transposed matrix of a transmitting side unitary matrix for the channel obtained after the SVD. Each element of the matrix H generally has a Gaussian distribution.

V is a unitary matrix which satisfies Equation 1 above for the selected channel H, wherein V $V^H=1$.

The water filling unit 111 performs water filling to a user signal to be transmitted, in order to optimize a channel state in a multi channel system, using a beamforming matrix V generated by the V generator 113 and an ESNR value selected in the ESNR detector 115. As a result, more power is allocated to better channels with higher ESNR. The water filling unit 111 does not perform water filling for a training signal, and performs water filling for a signal to be transmitted to a selected user. The training signal is a signal that is pre-known between the receiving apparatus and the transmitting apparatus.

The V operation unit 112 multiplies the V matrix with a signal output from the water filling unit 111, to allow the transmitting side multi-antenna unit 114 to generate an eigen beam. Such a beamforming method results in parallel channels between a transmitting side and a receiving side. Signals output from the V operation unit 112 are transmitted through the transmitting side multi-antenna unit 114.

The ESNR detector 115 detects ESNR values of signals transmitted from respective receiving apparatuses 120 through the transmitting side multi-antenna unit 114, compares the detected ESNR values with each other to select a maximum ESNR value, and provides the maximum ESNR value to the water filling unit 111.

The channel estimation and $U^H$ generator 123 of the receiving apparatus 120 estimates a channel information $H_1$ of a training signal received through the receiving side multi-antenna unit 121. The channel estimation and $U^H$ generator 123 performs SVD on the estimated channel information $H_1$ to generate $U_1^H$. The estimated channel information $H_1$ may generally be slightly different from channel information H selected by the transmitting apparatus 110.

The $U^H$ operation unit 122 performs decoding by multiplying $U_1^H$ by the training signal output from the receiving side multi-antenna unit 121, and plays a role to form parallel channels to the receiving apparatus 120.

The ESNR calculator 124 calculates an ESNR using noise detected by the decoding in the $U^H$ operation unit 122, and values output from the SVD operation in the channel estimation and $U^H$ generator 123, and transmits the calculated ESNR value to the transmitting apparatus 110 through the receiving side multi-antenna unit 121.

Figure 2:
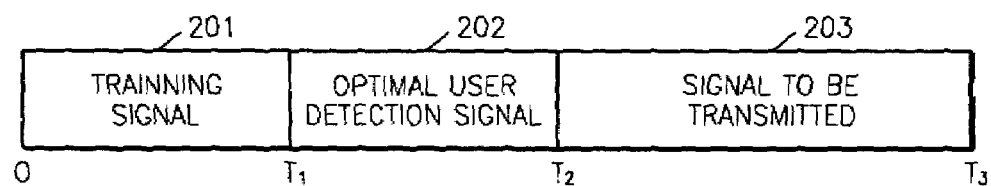
FIG. 2 illustrates a view showing signals transmitted and received by the system of FIG. 1 over time.
Figure 3:
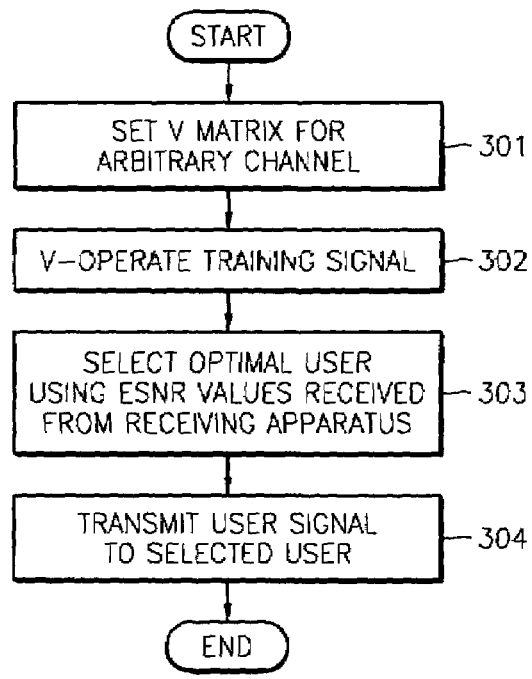
FIG. 3 is a flow chart illustrating a method for transmitting signals using multi-antennas according to an embodiment of the present invention.

Now, operations of the signal transmitting and receiving system using the multi-antenna of FIG. 1 will be described with reference to FIG. 1 through FIG. 4. FIG. 2 illustrates signals transmitted and received through the signal transmitting and receiving system of FIG. 1 during a predetermined time period. FIG. 3 and FIG. 4 are flow charts illustrating a signal transmitting method and a signal receiving method using multi-antennas, respectively.

Briefly, a signal transmitting apparatus and signal receiving apparatus communicate through multi-antennas as follows. First, a transmitting apparatus 110 transmits a training signal 201, selects a receiving apparatus having an optimal channel state, and then transmits a user signal to the selected receiving apparatus. As shown in FIG. 2, the training signal 201 is transmitted during a $0-T_1$ time period. A water filling unit 111 of the transmitting apparatus 110 does not perform water filling during the transmission of the training signal 201, and outputs the training signal 201 as it is. The V generator 113 sets a V matrix for an arbitrary channel (step 301). The V operation unit 112 multiplies the training signal 201 by the V matrix, to thereby perform an eigen beamforming. Then, the V operation unit 112 transmits the resultant signal through the transmitting side multi-antenna unit 114 (step 302).

An ESNR detector 115 detects ESNR values of signals received from respective receiving apparatuses 120, through the transmitting side multi-antenna unit 114, and selects a maximum value among the detected ESNR values (step 303). That is, a receiving apparatus 120 that is best matched to a channel selected arbitrarily in the V generator 113 is selected. The transmitting apparatus 110 transmits a user signal to the selected receiving apparatus 120 (step 304). An optimal user detection signal 202 of FIG. 2 represents ESNR values transmitted from respective receiving apparatuses 120 during a $T_1$–$T_2$ time period. A signal 203 to be transmitted, denoted in FIG. 2, represents a user signal to be transmitted from a transmitting apparatus 110 to a selected receiving apparatus 120, during a $T_2$–$T_3$ time period. The user signal is first subjected to water filling according to water filling values, wherein the water filling values are determined on the basis of the maximum ESNR value. Then, the resultant signal is multiplied by the V matrix to generate an eigen beam, and then is transmitted through the transmitting side multi-antenna unit 114.

A channel estimation and $U^H$ generator 123 of the receiving apparatus 120 estimates a channel state $H_1$ of a training signal received from a transmitting apparatus 110 (step 401). Channel estimation is performed to obtain information $H_1$ about the state of the channel through which the training signal has passed. Such channel state information may be easily obtained using any conventional method, such as a method described in "Blind Identification of MIMO channels: a closed form solution based on second order statistics", by Barroso. V. and Xavier. J., Conference Record of the Thirty-Third Asilomar Conference on Signal, System and Computers, Vol. 1, pages 70–74, issued in 1999.

The estimated channel state information $H_1$ may be represented using SVD as shown in Equation 2 below (step 402).

$$H_1 = U_1 A_1 V_1^H \quad (2)$$

The $U^H$ operation unit 122 decodes by multiplying $U_1^H$, obtained after the SVD, by the training signal output from the receiving side multi-antenna unit 121 (step 403). The decoded signal is represented as shown in Equation 3 below.

A signal decoded by $U_1^H$ on the received signal=

$$A_1 V_1 V^H X + N \quad (3)$$

In equation (3), N denotes Gaussian noise, X denotes a signal to be transmitted by the transmitting apparatus 110, and $A_1$ denotes a singular matrix obtained by performing SVD on the channel $H_1$ transmitted by the receiving apparatus 120.

Therefore, if $V_1 V^H$ is obtained as a matrix having values of one on the diagonal line thereof, the receiving apparatus 120 detects signals transmitted by the transmitting apparatus 110 in parallel corresponding to the respective antennas. However, since the transmitting apparatus 110 has performed the V matrix operation on an arbitrary channel H, $V^1 V^H$ results in a matrix not having values of one but having errors on the diagonal line thereof. By using an ESNR, a receiving apparatus 120, which is in an optimal state for a channel selected by the transmitting apparatus 110, may be detected. The ESNR is calculated by Equation 4 below using the result obtained by performing SVD for the channel $H_1$, and noise detected by the decoding of the $U^H$ operation unit 122.

$$ESNR = \frac{A_1 V_{ii}}{A_1 \sum V_{ij(i \neq j)} + N^2} \quad (4)$$

The ESNR calculator 124 calculates an ESNR using Equation 4, and transmits the ESNR to the transmitting apparatus 110 through the receiving side multi-antenna unit 121 (step 404). Such ESNR transmissions are performed by all receiving apparatuses (120) within a cell including the transmitting apparatus 110.

Then, the receiving apparatus 120 receives a user signal transmitted from the transmitting apparatus 110 (step 405). The user signal is transmitted to the receiving apparatus 120 selected by the transmitting apparatus 110. A received user signal is decoded by the $U^H$ operation unit 122.

As described above, according to the present invention, a transmitting apparatus performs eigen beamforming using ESNR information transmitted from a receiving apparatus. Accordingly, a high channel efficiency may be obtained without any channel information. Also, since an eigen beamforming unit is used, parallel channels are formed between a transmitting apparatus and receiving apparatuses. Therefore, by using multi-antennas in receiving apparatuses, highly efficient transmission is possible.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A signal transmitting apparatus, which transmits signals to a plurality of receiving apparatuses using multi-antennas, the transmitting apparatus comprising:
    a V generator, which generates a beamforming matrix V for a predetermined channel;
    a water filling unit, which does not perform water filling for a training signal that is pre-known by the receiving apparatuses, and performs water filling for a user signal to be transmitted, the water filling being performed using the V matrix and predetermined control values;
    a V operation unit, which multiplies a signal output from the water filling unit by the V matrix, and transmits the multiplied result through the multi-antennas; and
    a control value detector, which extracts the control values from signals received from the receiving apparatuses through the multi-antennas, and outputs a maximum value among the extracted values to the water filling unit.

2. The signal transmitting apparatus as claimed in claim 1, wherein the control values are effective signal-to-noise-ratios (ESNRs).

3. A plurality of signal receiving apparatuses that receive, through multi-antennas, signals that are transmitted by a transmitting apparatus through a plurality of channels, each signal receiving apparatus comprising:
    a channel estimation and $U^H$ generator, which estimates a state of a channel through which a training signal has been passed, and processes the estimated channel state information to generate matrices including a receiving side unitary matrix $U^H$ for the channel if the training signal is pre-known by the transmitting apparatus,
    an $U^H$ operation unit, which decodes by multiplying a signal received through the multi-antennas by $U^H$; and
    an effective-signal-to-noise-ratio (ESNR) calculator, which calculates an ESNR from noise detected during the decoding and the matrices, except the $U^H$, and outputs the ESNR to the transmitting apparatus through the multi-antennas if the signal received through the multi-antennas is the training signal that is pre-known by the transmitting apparatus.

4. The signal receiving apparatus as claimed in claim 3, wherein processing of the estimated channel state information is by singular value decomposition.

5. The signal receiving apparatus as claimed in claim 3, wherein the ESNR is calculated using the following equation:

$$ESNR = \frac{A_1 V_{ii}}{A_1 \sum V_{ij(i \neq j)} + N^2},$$

wherein the matrices, except $U^H$, are a channel gain matrix $A_1$ and a beamforming matrix $V_{ij}$ respectively, and N denotes the noise.

6. A signal transmitting and receiving system in which signals are transmitted and received between a transmitting apparatus and a plurality of receiving apparatuses, the transmitting apparatus and receiving apparatuses each including multi-antennas,
the signal transmitting apparatus comprising:
a V generator, which generates a beamforming matrix V for a predetermined channel;
a water filling unit, which does not perform water filling for a training signal that is pre-known by the receiving apparatuses, and performs water filling for a user signal to be transmitted, the water filling being performed using the V matrix and predetermined control values;
a V operation unit, which multiplies an output signal of the water filling unit by the V matrix, and transmits the multiplied result through the multi-antennas; and
a control value detector, which extracts the control values from a signal received from the receiving apparatuses through the multi-antennas, and outputs a maximum value among the extracted values to the water filling unit, and
each of the signal receiving apparatuses comprising:
a channel estimation and $U^H$ generator, which estimates a state of a channel through which the training signal has been passed, and processes the estimated channel state information to generate matrices including a receiving side unitary matrix $U^H$ for the channel if the training signal is received;
an $U^H$ operation unit, which decodes by multiplying a signal received through the multi-antennas by the $U^H$; and
a control value calculator, which calculates a predetermined control value from noise detected during the decoding and the matrices, except the $U^H$, and outputs the calculated result to the transmitting apparatus through the multi-antennas if the signal received through the multi-antennas is the training signal.

7. A signal transmitting method by which signals are transmitted to a plurality of signal receiving apparatuses using multi-antennas, the method comprising:
(a) setting a beamforming matrix V for a predetermined channel;
(b) operating the V matrix with a training signal that is pre-known by the signal receiving apparatuses and transmitting the operated result through the multi-antennas;
(c) receiving signals from the respective receiving apparatuses, extracting predetermined control values included in the received signals, and selecting a receiving apparatus having an optimal state for the channel by comparing the extracted control values; and
(d) transmitting a user signal to the selected receiving apparatus through the multi-antennas.

8. The signal transmitting method as claimed in claim 7, wherein the control values are ESNRs.

9. The signal transmitting method as claimed in claim 7, wherein (d) further comprises:
(d1) applying water-filling to the user signal using the maximum control value among the control values; and
(d2) multiplying the water-filling applied user signal by the V matrix and transmitting the multiplied result through the multi-antennas.

10. A signal receiving method in which signals transmitted from a transmitting apparatus through a plurality of channels are received using multi-antennas, the method comprising:
(a) a receiving apparatus receiving a training signal that is pre-known by the transmitting apparatus and estimating a state of a channel through which the training signal has been passed;
(b) processing the estimated channel state information to generate a plurality of matrices including a receiving side unitary matrix;
(c) decoding by multiplying the receiving side unitary matrix by the training signal; and
(d) calculating an effective-signal-to-noise-ratio (ESNR) using noise detected during the decoding and the matrices generated at (b), except the receiving side unitary matrix, and transmitting the calculated ESNR to the transmitting apparatus.

11. The signal receiving method as claimed in claim 10, further comprising:
(e) the transmitting apparatus receiving a user signal transmitted by the receiving apparatus; and
(f) decoding by multiplying the received user signal by the receiving side unitary matrix.

12. The signal receiving method as claimed in claim 10, wherein in (d), the ESNR is calculated by the following equation:

$$ESNR = \frac{A_1 V_{ii}}{A_1 \sum V_{ij(i \neq j)} + N^2},$$

wherein the matrices generated at (b), except the receiving side unitary matrix, are a channel gain matrix $A_1$, a beamforming matrix $V_{ij}$, respectively, and N denotes the noise.

13. A signal transmitting and receiving method by which signals are transmitted and received between a transmitting apparatus and a plurality of receiving apparatuses, the transmitting apparatus and receiving apparatuses each including multi-antennas, the method comprising:
(a) setting a beamforming matrix V for a predetermined channel in the transmitting apparatus;
(b) operating the V matrix with a training signal that is pre-known by the receiving apparatuses and transmitting the operated result through the multi-antennas;
(c) receiving the training signal and estimating a state of a channel through which the training signal has been passed, in the receiving apparatuses;
(d) processing the estimated channel state information to generate a plurality of matrices including a receiving side unitary matrix;
(e) decoding by multiplying the receiving side unitary matrix for the channel by the training signal;
(f) calculating an effective-signal-to-noise-ratio (ESNR) using noise detected during the decoding and the matrices generated at (d), except the receiving side unitary matrix, and transmitting the calculated ESNR to the transmitting apparatus; and (g) the transmitting apparatus extracting the ESNRs from signals received from the receiving apparatuses, selecting a receiving apparatus having an optimal state for the channel by using the extracted ESNR values, and transmitting a user signal to the selected receiving apparatus through the multi-antennas.

14. The signal transmitting and receiving method as claimed in claim 13, further comprising:
(h) the selected receiving apparatus decoding by multiplying the received user signal by the receiving side unitary matrix.

15. The signal transmitting and receiving method as claimed in claim 13, wherein in (f), the ESNR is calculated by the following equation:

$$ESNR = \frac{A_1 V_{ii}}{A_1 \sum V_{ij(i \neq j)} + N^2},$$

wherein the matrices generated at (d), except the receiving side unitary matrix, are a channel gain matrix $A_1$ and a beamforming matrix $V_{ij}$, respectively, and N denotes the noise.

16. The signal transmitting and receiving method as claimed in claim 13, wherein (g) further comprises:
(g1) extracting the ESNRs from the signals received from the receiving apparatuses;
(g2) comparing the extracted ESNRs with each other to select a maximum ESNR;
(g3) applying water filling to the user signal using the maximum ESNR; and
(g4) multiplying the water-filling applied user signal by the V matrix, and transmitting the multiplied result through the multi-antennas.

* * * * *